United States Patent
Castro Rojas et al.

(10) Patent No.: US 11,234,797 B2
(45) Date of Patent: Feb. 1, 2022

(54) DOUBLE DENTAL IMPLANT THAT REMAINS STABLE IN THE PRESENCE OF PERIIMPLANTITUS

(71) Applicant: Fernando Castro Rojas, Vallalord (ES)

(72) Inventors: Fernando Castro Rojas, Vallalord (ES); Fernando Castro García de la Barga, Vallalord (ES)

(73) Assignee: Fernando Castro Rojas, Vallalord (ES)

( * ) Notice: Subject to any disclaimer, the term of this patent is extended or adjusted under 35 U.S.C. 154(b) by 76 days.

(21) Appl. No.: 16/321,113

(22) PCT Filed: May 11, 2017

(86) PCT No.: PCT/ES2017/000053
§ 371 (c)(1),
(2) Date: Jan. 28, 2019

(87) PCT Pub. No.: WO2017/194798
PCT Pub. Date: Nov. 16, 2017

(65) Prior Publication Data
US 2019/0175311 A1    Jun. 13, 2019

(30) Foreign Application Priority Data
Jul. 29, 2016 (ES) ............... ES201600625

(51) Int. Cl.
*A61C 8/00* (2006.01)

(52) U.S. Cl.
CPC .............. *A61C 8/0068* (2013.01); *A61C 8/00* (2013.01)

(58) Field of Classification Search
CPC ....... A61C 8/0068; A61C 8/00; A61C 8/0022; A61C 8/005; A61C 8/006; A61C 8/0074; A61C 8/0075; A61C 8/0077; A61C 8/0018; A61C 8/0006; A61C 8/0042; A61C 8/0025; A61F 2002/30143; A61B 17/62; A61B 17/86; A61B 17/666; A61B 17/663; A61B 17/864; A61B 17/8685
USPC .................................. 433/173–174
See application file for complete search history.

(56) References Cited

U.S. PATENT DOCUMENTS

2004/0121289 A1* 6/2004 Miller ................. A61C 8/0022
                                                                433/174
2011/0287381 A1* 11/2011 Sanders ................ A61C 1/084
                                                                433/75

FOREIGN PATENT DOCUMENTS

CN        102240228 A   * 11/2011
WO     WO-9901080 A1  * 1/1999  ........... A61B 17/666
WO   WO-2006107292 A1 * 10/2006 ............ A61B 17/60
(Continued)

*Primary Examiner* — Nicholas D Lucchesi
*Assistant Examiner* — Mirayda A Aponte
(74) *Attorney, Agent, or Firm* — Hamre, Schumann, Mueller & Larson, P.C.

(57) ABSTRACT

An implant formed by two implants: an upper implant and a lower implant, the upper implant being removable. The implant differs from conventional implants in that the body of the implant has a second polished collar corresponding with the beginning of the lower implant. The two implants are connected by a screw located in the lower part of the upper implant of which it forms a part, the screw engaging with the thread of the lower implant. The connection between the two implants is circular, as it must allow anticlockwise rotation when removed.

18 Claims, 3 Drawing Sheets

(56) References Cited

FOREIGN PATENT DOCUMENTS

WO     WO-2016035614 A1 * 3/2016 ............... A61C 8/00

* cited by examiner

DOUBLE DENTAL IMPLANT THAT REMAINS STABLE IN THE PRESENCE OF PERIIMPLANTITUS

OBJECT OF THE INVENTION

This invention refers to a double dental implant (upper/lower) characterised in that it is stable against peri-implantitis, avoiding its treatment and/or consequences of losing the implant, and also useful in aesthetic and prosthetic complications.

Currently, implantology techniques are widely used to replace missing teeth with implants, where the implant would have the same function as the tooth root. The corresponding dental prosthesis is attached to the implant.

This technique of dental rehabilitation is generally summarised in two phases:

Initial phase of surgery, where the implants that will be the fixings for the prosthesis or dental pieces that need to be replaced, are placed.

Second phase, where the measurements of the patient's mouth are taken to make and then place the prosthesis on the implants. Aiming to regain the functions of the lost pieces (chewing, aesthetics, etc.).

One of the most influential factors on the success of the implant is the balance between the microorganisms of the mouth and the patient's defences. When this equilibrium is broken, it can lead to periodontitis in the teeth with loss of bone surrounding the root and in the implants for peri-implantitis with loss of bone surrounding the implant.

The treatment of peri-implantitis is currently a problem with unpredictable results.

This is mainly due to the difficulty of accessing the contaminated area of the implant, its coils, the surface of the implant that has been previously treated with micro-roughness to favour the osseointegration of the implant in the bone, although difficult to clean, decontaminate and polish while being contaminated by microorganisms and their detritus.

As a result, there are many varied treatments, but few successful, leading in many cases to the loss of the implant.

This invention would be ideal for the cases of peri-implantitis in which the loss of the bone around the implant only affects the upper implant, allowing the second implant (lower) to be left, with the same features as the double implant, but shorter.

In this situation we remove the contaminated part (upper implant), leaving another implant (lower implant) in the same position and connection without having to perform a new surgery to place another new implant, which is also usually accompanied by a bone graft, with the posterior new prosthesis, after the waiting time of the integration of this implant.

Another advantage is that in addition to leaving the lower implant that remains integrated in the bone, it is possible to leave the prosthesis that the patient has, if we replace the upper implant with a transepithelial abutment of the same height and connection of the implant that we have removed.

To this we must add the situation that is achieved with the transepithelial pillar that has a smooth and polished surface, which is what is sought in the treatments of the peri-implantitis.

Another complication that we can solve is of aesthetic nature, a situation that can be seen when an implant has titanium turns seen or transparent through the gum. One could consider replacing the upper implant with a transepithelial abutment with a white or pink porcelain veneer.

In the case of prosthetic complications, there are situations where the screw that holds the prosthesis is broken and cannot be rescued, leaving an implant unusable; this would be solved by removing the upper implant with the broken screw and placing either another new upper implant or another transepithelial pillar of the upper implant measurement.

Another advantage of the double implant would be the possibility of recognising it in an x-ray when viewing a second polished band in the implant body.

The industrial application of this invention is within the field of dental surgery and, more specifically, dental implants.

BACKGROUND OF THE INVENTION

Although no invention identical to that described has been found, listed below are the documents found that reflect the state of the art related thereto.

Thus, document ES2281995A1 refers to improvements introduced in dental implants, specifically in relation to the distribution of surface types in contact with bone for their osseointegration (hydroxyapatite coating or with rough finish), in cylindrical titanium or alloys of titanium implants, presenting a polished area or neck (2) emerging from the maxilla and occupying around 1.5 to 2 mm, in which the prosthetic part of the implant is inserted, and the remaining area has its surface treated to get the desired surface finish, the surface finish consists of carrying out a first phase of hydroxyapatite coating (4) leaving a band or area (8) around 4±2 mm of the implant free of the after the polished neck (2), which will then be subjected to the rough treatment (3) to submerge it conventionally in acids and sandblast with different substances. At no time is the double implant solution proposed by the main invention mentioned.

E51025017U proposes a dental implant, made with a cylindrical titanium body defined by: an upper section of a larger diameter; a middle section and a lower apical section; the upper section called coronal is divided into three sections; one threaded, another that defines a perimetric groove, and the external one that is truncated; the middle sections consists of an external threaded portion, and another portion of smaller diameter with recesses that are occupied by newly formed bone; the lower apical section is conical or pyramidal with equally arranged recesses that are add-ons to ensure the anti-rotation of the implant; and as between the end threaded portion and the portion of smaller diameter of the middle section inclined holes are made in communication with the bottom of an axial blind bore having a threaded inner section as an extension of a widening of the bore of the upper section in the one that engages the emerging tooth. As in the previous case, the solution of the implant executed in two, upper and lower is not mentioned.

E52363046T3 describes an implant with anti-inflammatory or antibacterial effects, or both, intended for implantation in the human body or in the body of an animal, the implant comprising a combination of porous grains or granules, in which the porous grains or granules—made from titanium, one or more titanium oxides or titanium alloys and with a layer of titanium oxide on their surfaces;—have an average length from one side to the opposite side, through a geometric centre, from 200 μm up to 5 mm:—they have an average specific surface area of at least 0.15 m$^2$/g according to the Brunauer-Emmett-Teller (BET) method. The solution as an implant again does not include two parts as the main invention.

Thus E52555827A1 refers to a procedure for the application of an antibacterial protection in a dental implant; said implant comprising at least one external surface formed of titanium or a titanium alloy; characterised in that it comprises: a) a preliminary preparation of the external surface of the implant; including at least one of the following operations: grinding, polishing, cleaning, decontaminating and/or removing a layer of titanium oxide from said external surface of the implant, and b) depositing silver particles on an external surface of the implant, titanium or a titanium alloy, by means of a pulsed electrochemical anodisation process. Again, it is not based on the division of the implant into two overlapping implants as proposed by the main invention.

ES2432416T3 proposes a dental implant for the anchoring of dental prostheses, with a coating (6) of zirconium nitride (ZrN) with a thickness layer of 1 to 10 μm. Nor does it mention the application of a double implant.

ES2392582T3 describes a cylindrical dental implant based on titanium or titanium alloys, having a polished area or neck emerging from the implant and occupying an area between 1.5 to 2 mm, in which the neck of the false tooth implant is designed to be inserted, and the remaining area has its surface treated, the implant comprises a coating of hydroxyapatite leaving a band or area of the implant around 4+2 mm free following the polished neck and said band or area having a rough surface achieved through the treatment after submitting it to acids and sandblasting. The proposed solution does not consist of the implant divided into two overlapping implants as proposed by the main invention.

Conclusions: As can be seen from the research carried out, none of the documents found solve the problems raised as the proposed invention does.

DESCRIPTION OF THE INVENTION

The stable double dental implant against peri-implantitis, subject of this invention is made up of an implant formed by two implants: an upper implant and a lower implant, with the ability to remove the upper implant.

The double implant only differs externally from the classic implant in having a second polished band in the body of the implant, which corresponds to the start of the lower implant.

The connection between the two implants is by means of a screw located in the lower part of the upper implant of which it forms a part, extending along the thread of the lower implant.

The connection between both is circular, since it has to allow for counter-clockwise rotation when it is removed.

BRIEF DESCRIPTION OF THE DRAWINGS

For a clearer understanding of this invention some drawings representing a preferred implementation are attached to this description.

Figure 1:
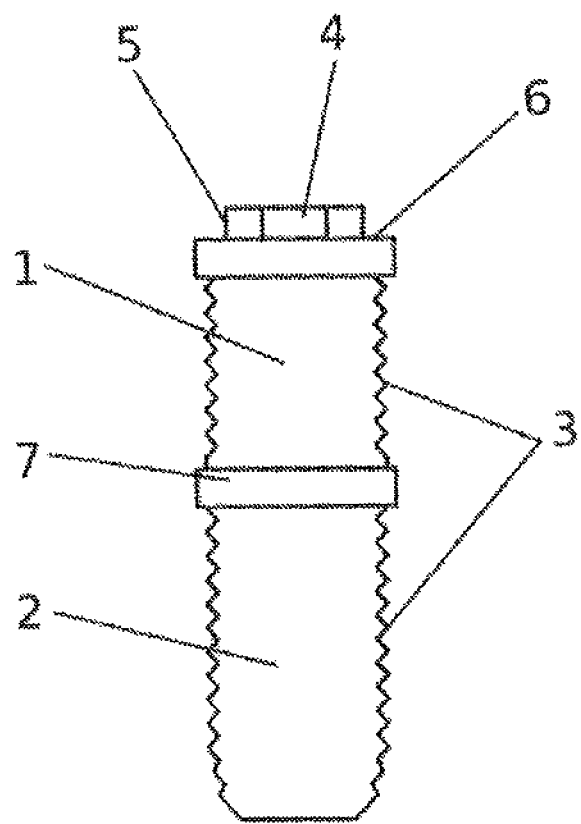
FIG. 1: Cross-section of the double implant object of the invention
Figure 2:
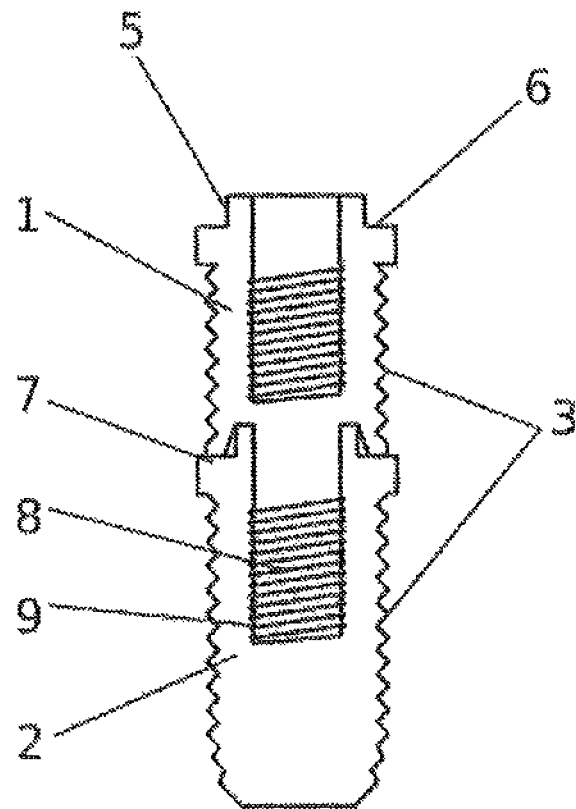
FIG. 2: Sectional view of the elevation of the double implant
Figure 3:
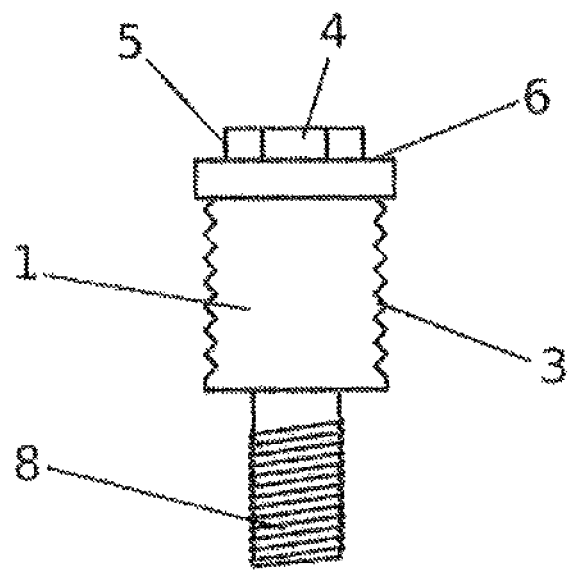
FIG. 3: Cross-section of the upper implant
Figure 4:
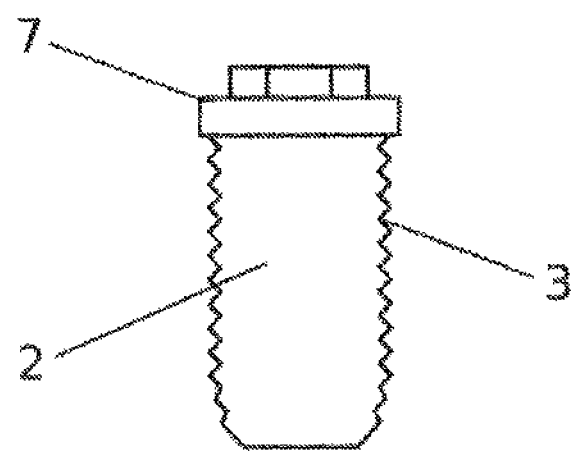
FIG. 4: Cross-section of the lower implant

The numerical references that appear in said figures correspond to the following constituent elements of the invention:

1. Upper implant
2. Lower implant
3. Self-tapping spindles
4. Hexagon
5. Height of the hexagon
6. Connecting platform
7. Polished band
8. Connecting screw
9. Connecting thread

DESCRIPTION OF PREFERENTIAL IMPLEMENTATION

A preferred implementation of the stable double dental implant against peri-implantitis subject of the present invention, with reference to the numerical references, can be based on an implant consisting of two implants: upper implant (1) and lower implant (2), with the ability to remove the upper implant (1).

Regarding morphology and connection, it comprises those of the classic implant: cylindrical morphology, in self-tapping turns (3) with narrower apex, connected to a 2.70 mm external hexagon (4), 0.70 mm in height (5) and a 4.10 mm linking platform (6). The diameter of the implant (1, 2) is 4.10 mm and the height 11.5 mm.

The double implant (1, 2) only differs externally from the classic implant in having a second polished band (7) in the body of the implant (1, 2), which corresponds to the start of the lower implant (2).

The connection between the two implants (1, 2) is by means of a screw (8) that is located in the lower part of the upper implant (1) and of which it forms part, staying in the thread (9) of the lower implant (2).

The connection between both (1, 2) is circular, since it has to allow for counter-clockwise rotation when it is removed.

The invention claimed is:

1. A double dental implant, consisting of:
    a single piece upper implant and a single piece lower implant;
    the single piece lower implant having an upper end, a first spindle with a first exterior thread having an outer diameter, and a first central hole extending from the upper end toward a lower end of the single piece lower implant, the first central hole includes a first interior thread having an interior diameter that is constant from a first end to a second end thereof;
    the single piece upper implant includes an upper end, a screw at a lower end thereof that is receivable within the first central hole and the screw has a second exterior thread that is engagable with the first interior thread, the second exterior thread has an outer diameter that is constant from a first end to a second end thereof, the interior diameter equaling the outer diameter, a second spindle having a third exterior thread having an outer diameter, the outer diameter of the third exterior thread is equal to the outer diameter of the first exterior thread, and a second central hole extending from the upper end of the upper implant toward a lower end thereof, and the second central hole includes a second interior thread; and
    the single piece lower implant includes a hex head at the upper end thereof, and the third exterior thread overlaps the hex head.

2. The double dental implant of claim 1, wherein the second central hole is spaced from the screw, and the second central hole is colinear with the screw.

3. The double dental implant of claim 1, wherein the third exterior thread does not overlap the second exterior thread in a longitudinal direction.

4. The double dental implant of claim 1, wherein the second interior thread and the third exterior thread overlap each other in a longitudinal direction.

5. The double dental implant of claim 1, wherein the single piece lower implant further includes a band between the hex head and the first exterior thread, the band has a diameter greater than an outer diameter of the first exterior thread, and an end of the single piece upper implant abuts against the band.

6. A double dental implant, comprising:
a single piece lower implant having an upper end, a first spindle with a first exterior thread, and a first central hole extending from the upper end toward a lower end of the single piece lower implant, the first central hole includes a first interior thread having an interior diameter that is constant from a first end to a second end thereof, and the first exterior thread and the first interior thread overlap one another in a longitudinal direction of the single piece lower implant;
a single piece upper implant having an upper end, a screw at a lower end thereof that is receivable within the first central hole and the screw has a second exterior thread that is engagable with the first interior thread, the second exterior thread having an outer diameter that is constant from a first end to a second end thereof, the interior diameter equaling the outer diameter, a second spindle having a third exterior thread having an outer diameter, the outer diameter of the third exterior thread is equal to the outer diameter of the first exterior thread, and a second central hole extending from the upper end of the single piece upper implant toward a lower end thereof, the second central hole includes a second interior thread, and the third exterior thread and the second interior thread overlap one another in a longitudinal direction of the single piece upper implant and
the single piece lower implant includes a first external hex head at the upper end thereof, and the first central hole extends through the first external hex head; and the single piece upper implant includes a second external hex head at the upper end thereof, and the second central hole extends through the second external hex head.

7. The double dental implant of claim 6, wherein the single piece upper implant includes a space defined between a lower end of the second spindle and the screw, and the first external hex head is disposed in the space when the single piece upper implant is secured to the single piece lower implant.

8. The double dental implant of claim 6, further comprising a first band between the first external hex head and the first spindle, and a second band between the second external hex head and the second spindle.

9. The double dental implant of claim 6, wherein the second central hole is spaced from the screw, and the second central hole is colinear with the screw.

10. The double dental implant of claim 6, wherein the third exterior thread does not overlap the second exterior thread in a longitudinal direction.

11. The double dental implant of claim 6, wherein the third exterior thread overlaps the first external hex head.

12. The double dental implant of claim 11, wherein the single piece lower implant includes a band at the upper end thereof, the band has a diameter greater than an outer diameter of the first exterior thread, and an end of the single piece upper implant abuts against the band.

13. The double dental implant of claim 6, further comprising a platform between the second external hex head and the third exterior thread, and the third exterior thread has an outer diameter that is constant from the platform to an end of the third exterior thread.

14. The double dental implant of claim 13, wherein the outer diameter of the third exterior thread is greater than the outer diameter of the second exterior thread.

15. The double dental implant of claim 13, wherein the platform has a diameter that is greater than the outer diameter of the third exterior thread.

16. A double dental implant, consisting of:
a single piece upper implant and a single piece lower implant;
the single piece lower implant having an upper end, a first spindle with a first exterior thread having an outer diameter, and a first central hole extending from the upper end toward a lower end of the single piece lower implant, the first central hole includes a first interior thread having an interior diameter that is constant from a first end to a second end thereof;
the single piece upper implant includes an upper end, a screw at a lower end thereof that is receivable within the first central hole and the screw has a second exterior thread that is engagable with the first interior thread, the second exterior thread has an outer diameter that is constant from a first end to a second end thereof, the interior diameter equaling the outer diameter, a second spindle having a third exterior thread having an outer diameter, the outer diameter of the third exterior thread is equal to the outer diameter of the first exterior thread, and a second central hole extending from the upper end of the upper implant toward a lower end thereof, and the second central hole includes a second interior thread; and
the single piece upper implant includes a hex head at the upper end thereof, a platform between the hex head and the third exterior thread, and the third exterior thread has an outer diameter that is constant from the platform to an end of the third exterior thread.

17. The double dental implant of claim 16, wherein the outer diameter of the third exterior thread is greater than the outer diameter of the second exterior thread.

18. The double dental implant of claim 16, wherein the platform has a diameter that is greater than the outer diameter of the third exterior thread.

* * * * *